United States Patent
Faigle

[19]

[11] Patent Number: 6,113,178
[45] Date of Patent: Sep. 5, 2000

[54] VEHICLE ENERGY ABSORPTION APPARATUS

[75] Inventor: Ernst M. Faigle, Dryden, Mich.

[73] Assignee: TRW Vehicle Safety Systems Inc., Lyndhurst, Ohio

[21] Appl. No.: 09/144,050

[22] Filed: Aug. 31, 1998

[51] Int. Cl.[7] ............................ B60R 19/26; B60R 19/34
[52] U.S. Cl. .................... 296/189; 296/188; 293/132; 293/133
[58] Field of Search ...................... 296/188, 189, 296/204, 203.01; 293/132, 133, 117, 2, 4

[56] References Cited

U.S. PATENT DOCUMENTS

| | | | |
|---|---|---|---|
| 2,637,592 | 5/1953 | Karlby | 296/901 |
| 3,848,886 | 11/1974 | Feustel et al. | 296/189 |
| 4,050,537 | 9/1977 | Bez | 296/189 |
| 5,263,740 | 11/1993 | Frey et al. | |
| 5,431,445 | 7/1995 | Wheatley | 296/189 |

*Primary Examiner*—D. Glenn Dayoan
*Assistant Examiner*—Greg Blankenship
*Attorney, Agent, or Firm*—Tarolli, Sundheim, Covell, Tummino & Szabo L.L.P.

[57] ABSTRACT

An apparatus (10) for absorbing energy in the event of a vehicle collision comprises a structural member (12, 38) of a vehicle (14). A pyrotechnic device (50) is mounted adjacent to the structural member (12, 38). The pyrotechnic device (50) is actuatable to generate combustion products and to direct the combustion products into engagement with the structural member (12, 38) to weaken the structural member. The weakening of the structural member (12, 38) enables controlled deformation of the structural member in the event of application to the structural member of force exceeding a predetermined amount.

3 Claims, 2 Drawing Sheets

VEHICLE ENERGY ABSORPTION APPARATUS

BACKGROUND OF THE INVENTION

The present invention relates to an apparatus for absorbing energy in the event of a vehicle collision to help protect an occupant of the vehicle.

It is known to provide one or more crush zones in a frame of a vehicle such as an automobile. The crush zones are designed to crush, or deform, in the event of a vehicle collision. The deformation of the frame absorbs energy of the collision to help protect an occupant of the vehicle. The frame may be configured to deform in a certain manner upon the application of force exceeding a predetermined amount. Alternatively, a frangible structure such as a shear pin construction joining two frame elements may be provided.

SUMMARY OF THE INVENTION

The present invention is an apparatus for absorbing energy in the event of a vehicle collision to help protect an occupant of the vehicle. The apparatus comprises a structural member of a vehicle, and a pyrotechnic device mounted adjacent to the structural member. The pyrotechnic device is actuatable to generate combustion products and to direct the combustion products into engagement with the structural member to weaken the structural member. The weakening of the structural member enables controlled deformation of the structural member in the event of a force being applied to the structural member that exceeds a predetermined amount.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS OF THE INVENTION

Figure 1:
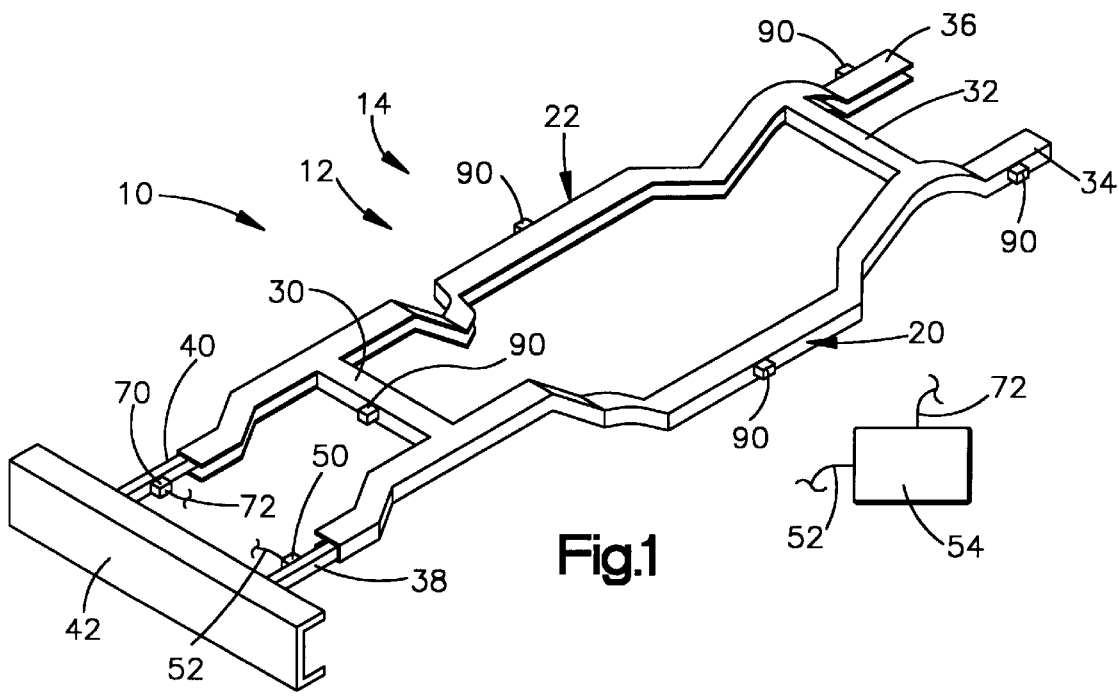
FIG. 1 is a pictorial view of a vehicle frame including a safety apparatus in accordance with a first embodiment of the present invention.

The present invention relates to an apparatus for absorbing energy in the event of a vehicle collision to help protect an occupant of the vehicle. As representative of the present invention, FIG. 1 illustrates schematically a safety apparatus 10 including a frame 12 for a vehicle 14, such as an automobile. The vehicle 14 has a body on frame construction; the frame 12 is the only portion of the vehicle 14 which is shown. FIG. 1 is only a schematic representation of a vehicle frame 12 and is not intended to represent the frame of any particular vehicle. Thus, the locations and configurations of the various frame portions are illustrative only.

The frame 12 includes left and right side rails 20 and 22 connected by front and rear cross-members 30 and 32. Rear end portions 34 and 36 of the side rails 20 and 22 extend rearward from the rear cross-member 32. Front end portions 38 and 40 of the side rails 20 and 22 extend forwardly from the front cross-member 30. A front bumper 42 of the vehicle 14 is connected to and extends between the front end portions 38 and 40 of the side rails 20 and 22.

A pyrotechnic device 50 is mounted on the front end portion 38 of the side rail 20. The pyrotechnic device 50 is connected by lead wires 52 to vehicle electric circuitry indicated schematically at 54.

The vehicle electric circuitry 54 includes means for sensing a front impact collision involving the vehicle and for actuating the pyrotechnic device 50 in response to the sensing of a front impact collision. The sensing means may include a deceleration sensor for sensing vehicle deceleration indicative of a vehicle collision having a severity greater than a predetermined threshold value. As discussed below, the vehicle electric circuitry 54 provides an electric signal over the lead wires 52 to the pyrotechnic device 50 when the pyrotechnic device is to be actuated.

Figure 9:
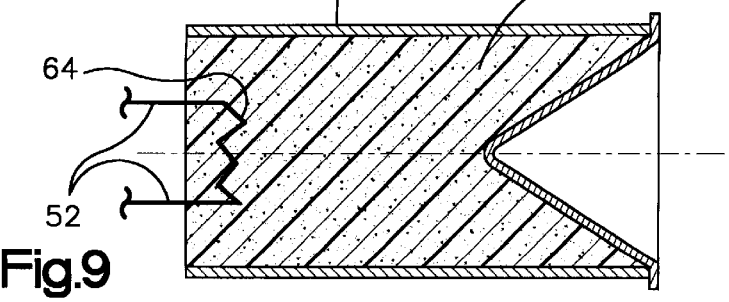
FIG. 9 is a sectional view of a shaped charge pyrotechnic device which forms a part of the safety apparatus of the present invention.

The pyrotechnic device 50 is preferably a shaped charge of the type shown in FIG. 9 including a metal housing 60 enclosing a body of pyrotechnic material 62. A bridge wire 64 or other heating element is disposed in intimate contact with the body of pyrotechnic material 62. The bridge wire 64 is connected across the lead wires 52.

Figure 2:
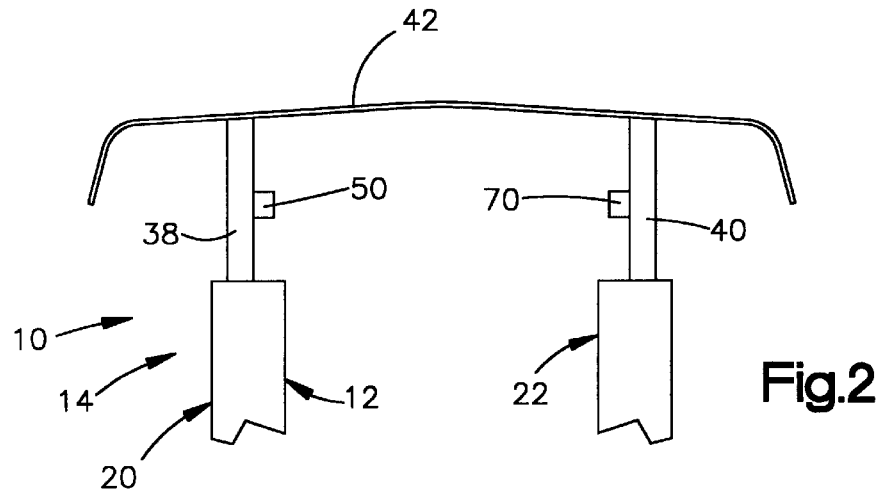
FIG. 2 is an enlarged schematic view of the safety apparatus of FIG. 1, shown in a condition prior to actuation.

Another pyrotechnic device 70 (FIGS. 1 and 2) is mounted on the front end portion 40 of the side rail 22. The pyrotechnic device 70 is identical in construction to the pyrotechnic device 50. The pyrotechnic device 70 is connected by lead wires 72 with the vehicle electric circuitry 54.

In the event of a front impact to the vehicle 14 of a magnitude greater than the predetermined threshold value, the vehicle electric circuitry 54 provides an electrical signal over lead wires 52 to the pyrotechnic device 50. An electric current flows through the bridgewire 64. The bridgewire 64 generates heat which ignites the pyrotechnic material 62. The pyrotechnic material 62 burns through the housing 60 and a jet of flame or heat is directed from the pyrotechnic device 50 toward the side rail 38. The hot combustion products of the pyrotechnic device 50 contact the end portion 38 of the side rail 20 and weaken it.

The second pyrotechnic device 70 is, at the same time, actuated by electric current over its lead wires 72. The second pyrotechnic device 70 generates hot combustion products which contact and weaken the side rail 22 at the location of the second pyrotechnic device.

Figure 3:
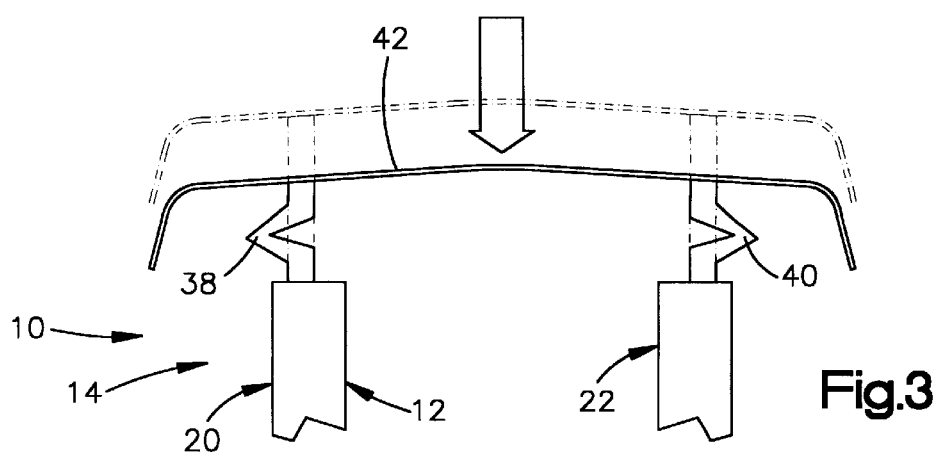
FIG. 3 is a view similar to FIG. 2 showing the safety apparatus of FIG. 1 in a condition after actuation.

The force of the front impact to the vehicle 14 is transmitted through the vehicle bumper 42 into the front end portions 38 and 40 of the side rails 20 and 22. In the event of application to the side rails of an impact force exceeding a predetermined amount, the side rails 20 and 22 deform at the locations where they have been weakened by the pyrotechnic devices 50 and 70, as illustrated schematically in FIG. 3. The deformation of the side rails 20 and 22 absorbs energy of the front impact collision, helping to protect the occupants of the vehicle 14. The use of the pyrotechnic devices 50 and 70 enables controlled deformation of the side rails 20 and 22, at the selected locations.

The side rails 20 and 22 are undeformed and unweakened until the front impact to the vehicle. The use of the pyrotechnic devices 50 and 70 is thus advantageous over the use of a shear pin, for example. In addition, there is no tolerance or rattle problem as there may be with a shear pin construction.

Figures 4, 5, 6, 7:
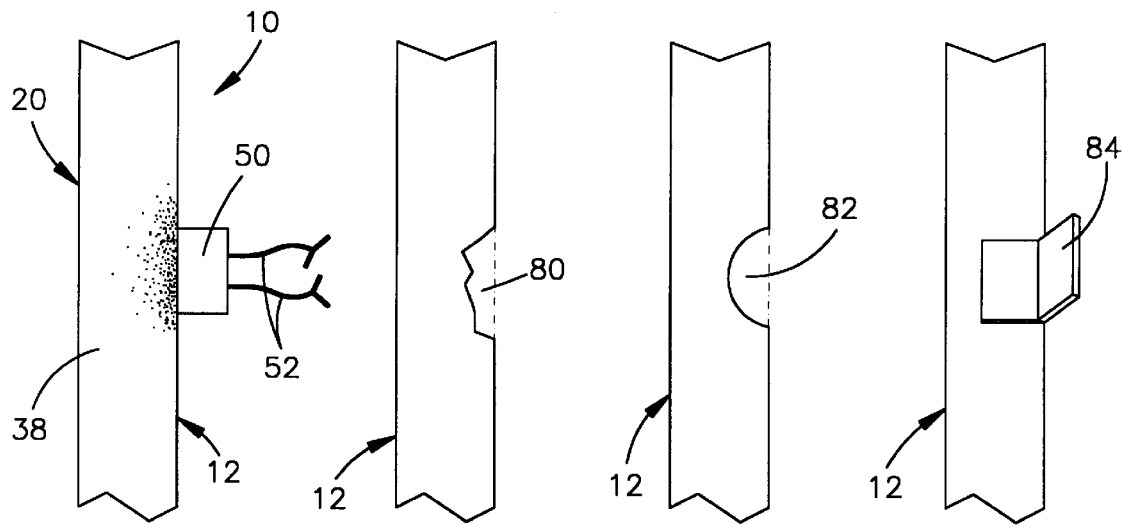
FIG. 4 is a schematic view showing one mode of operation of the safety apparatus of FIG. 1.
FIG. 5 is a view similar to FIG. 4 showing a second mode of operation of the safety apparatus of FIG. 1.
FIG. 6 is a view similar to FIG. 4 showing a third mode of operation of the safety apparatus of FIG. 1.
FIG. 7 is a view similar to FIG. 4 showing a fourth mode of operation of the safety apparatus of FIG. 1.

In accordance with the present invention, a pyrotechnic device such as the pyrotechnic device 50 or 70 may act on the vehicle frame 12 in alternative ways. For example, the pyrotechnic device may be arranged so that its combustion products burn or blow or blast an opening 80 in the frame 12 as illustrated schematically in FIG. 5. The combustion products of the pyrotechnic device may remove a predetermined weakened portion 82 of the frame 12 as illustrated schematically in FIG. 6. The combustion products of the pyrotechnic device may open a predetermined tab portion 84 of the frame member as illustrated schematically in FIG. 7.

The pyrotechnic device may be located elsewhere on the vehicle frame 12 to provide controlled weakening of desired areas of the frame. The pyrotechnic devices can be located to reduce the cost of repair of the vehicle 14 after a vehicle collision, by having a more easily repairable area of the vehicle deform. Alternative locations are illustrated at 90 in FIG. 1.

Figure 8:
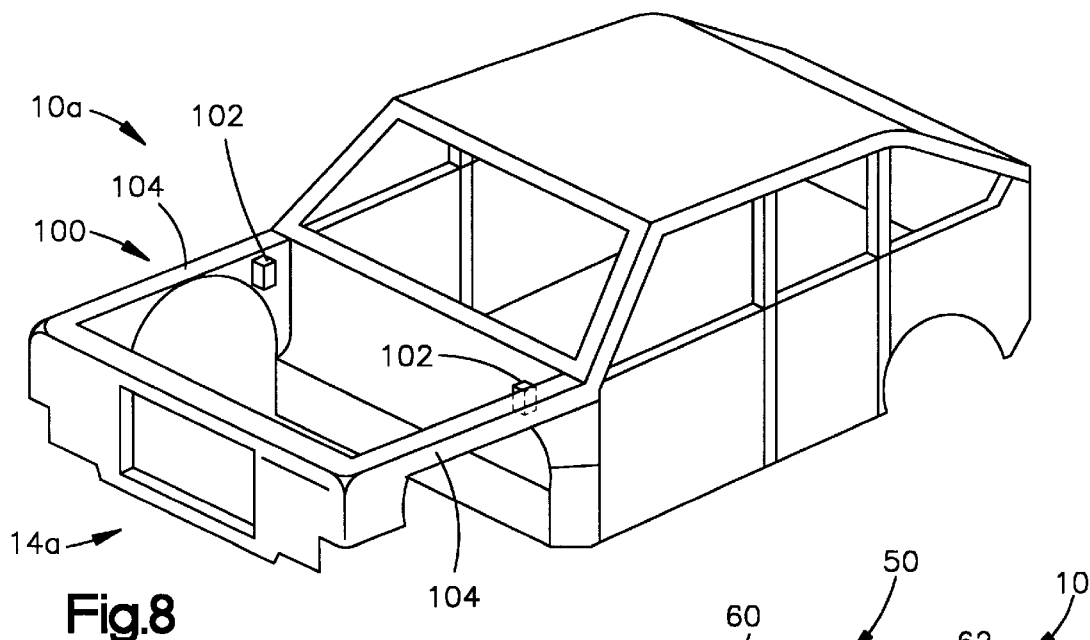
FIG. 8 is a pictorial view of a vehicle unibody including a safety apparatus in accordance with another embodiment of the present invention.

FIG. 8 illustrates use of the present invention on a vehicle 14a having a unibody construction. The vehicle unibody is illustrated at 100. A pair of pyrotechnic devices 102 are shown mounted to the unibody on the front side members 104. The pyrotechnic devices 102 are actuatable and function in a similar manner as the pyrotechnic devices 50 and 70 illustrated in FIG. 1. The pyrotechnic devices 102 may be located elsewhere on the vehicle unibody 100.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for absorbing energy in the event of a vehicle collision to help protect an occupant of the vehicle, said apparatus comprising:

a structural member of a vehicle; and a pyrotechnic device mounted adjacent to said structural member;

said pyrotechnic device being actuatable to generate combustion products and to direct said combustion products into engagement with said structural member to weaken said structural member and thereby to enable controlled deformation of said structural member in the event of application to said structural member of force exceeding a predetermined amount;

said location of said pyrotechnic device adjacent to said structural member being selected to cause said combustion products to remove a portion of said structural member and thereby to weaken said structural member.

2. An apparatus as defined in claim 1 said combustion products remove said portion of said structural member by burning away said portion of said structural member.

3. An apparatus as defined in claim 1 wherein said combustion products remove said portion of said structural member by blowing or blasting away said portion of said structural member.

* * * * *